United States Patent [19]
Halder

[11] Patent Number: 5,902,077
[45] Date of Patent: May 11, 1999

[54] VARIABLE SPEED UNIVERSAL DRILLING TAPPING AND REAMING MACHINE

[75] Inventor: Achyuta N. Halder, San Dimas, Calif.

[73] Assignee: Marking Methods, Inc., Alhambra, Calif.

[21] Appl. No.: 09/044,674

[22] Filed: Mar. 20, 1998

[51] Int. Cl.⁶ .................................................. B23B 39/04
[52] U.S. Cl. ............................... 408/9; 408/88; 408/100; 408/129; 408/234
[58] Field of Search ............................. 408/9, 6, 88, 89, 408/90, 129, 131, 99, 100, 102, 234, 236, 237

[56] References Cited

U.S. PATENT DOCUMENTS

| | | | |
|---|---|---|---|
| 1,809,188 | 6/1931 | Barnes | 408/234 |
| 1,856,846 | 5/1932 | Duncan | 408/89 |
| 3,712,175 | 1/1973 | Muller et al. | 408/234 |
| 3,874,809 | 4/1975 | Hahn et al. | 408/9 |
| 3,940,970 | 3/1976 | Terral et al. | 408/90 |
| 4,118,141 | 10/1978 | Spohn, Jr. | 408/90 |
| 4,209,273 | 6/1980 | Lehnen | 408/9 |
| 5,014,793 | 5/1991 | Germanton et al. | 173/12 |
| 5,401,124 | 3/1995 | Hettich | 408/6 |
| 5,634,748 | 6/1997 | Brazell et al. | 408/89 |

OTHER PUBLICATIONS

Walden International Machinery Corporation, (Author). Walden's Flexible Arm Drilling Machine (Title) Two pages, Date unknown.

*Primary Examiner*—Andrea L. Pitts
*Assistant Examiner*—Adesh Bhargava
*Attorney, Agent, or Firm*—Shlesinger, Fitzsimmons & Shlesinger

[57] ABSTRACT

One of two arms is mounted adjacent one end thereof for rotation and axial adjustment on a cylindrical column which projects vertically upwardly from a generally flat, rigid base. The second arm is rotatably connected adjacent one end to the opposite end of the first arm, and has mounted in its opposite end a rotatable spindle which is connected at its upper end to the drive shaft of a reversible electric motor that is secured on the second arm, and which is disposed to have a tool bit secured releasably to its lower end. The first arm is manually adjustable vertically on the column, and each arm can be releasably locked against rotation. The direction of rotation of the motor can be reversed by a switch mounted on the second arm and its speed can be adjusted by a potentiometer, the rotatable handle of which is mounted on the second arm adjacent the motor reversing switch.

16 Claims, 3 Drawing Sheets

VARIABLE SPEED UNIVERSAL DRILLING TAPPING AND REAMING MACHINE

BACKGROUND OF THE INVENTION

This invention relates to a combination drilling, tapping and reaming machine, and more particularly to an improved such machine capable of operating at variable speeds and having improved characteristics which make it universally suitable for drilling, reaming, boring and tapping operations.

From the early days of industrialization, there existed the need for a machine to make holes in manufactured products, and as a result of such need an early invention produced what is universally known as a drill press. Typically when such press is in use, a workpiece is clamped onto the base of the associated machine beneath a powered drill bit, and subsequently the drilling operation is effected. For drilling multiple holes the parts on such early machines were repositioned relative to the associated drill bit each time a new hole in the part was to be made. To eliminate the need for repositioning the workpiece, there next was invented a device known as a radial drilling machine wherein the workpiece was fixed to the base, and the drill head itself was moved relative to the workpiece to form therein holes at a variety of different spots. Even so, the radial drilling machine had the disadvantage that it was extremely difficult to locate an associated drill bit to a pin-point drilling position.

As subsequent improvements, the industry developed a jig boring machine for more accurate control of movements in the X and Y direction, and even later in the Z axis direction for example by electromechanical apparatus, or more recently by programmable computer controlled devices (CNC). These latter machines, however, are extremely costly, and thus are not suitable for use by general industrial workshops of modest means.

Accordingly, it is an object of this invention to provide an improved drilling, tapping and reaming machine of the type in which the drilling head is easily repositionable relative to a stationary workpiece accurately to position the drilling head with minimum physical exertion by the operator, and at a very moderate cost compared to sophisticated electromechanical apparatus such as programmable computer controlled devices (CNC).

A further object of this invention to provide an improved machine of the type described in which has a drilling head that is movable manually relative to a stationary workpiece, and which includes manually operable means for releasably locking the drilling head in registry with predetermined points on the workpiece.

Still another object of this invention is to provide an improved, relatively small and yet sturdy machine of the type described which has thereon a drilling head which can be rapidly and accurately repositioned to multiple locations without exerting any significant force on the part of the operator or the associated equipment, and without compromising the accuracy (the perpendicularity) of the associated drilling, tapping or reaming operation.

Still a further object of this invention is to provide an improved, readily transportable machine of the type described, yet which unlike the machines in its class ideally counterreacts the opposite drilling force produced during a drilling operation, whereby the operator does not have to exert any additional force on the workpiece during the drilling operation.

Still a more specific object of this invention is to provide a machine of the type described having an improved electric motor and control means therefor which enable operation of the associated tool at variable speeds, and which automatically adjust the speed for maintaining a fixed torque on a workpiece, when an extra load is applied to the associated drill bit.

Other objects of this invention will be apparent hereinafter from the specification and from the recital of the appended claims, particularly when read in conjunction with the accompanying drawings.

SUMMARY OF THE INVENTION

The machine has a very heavy, cast iron base having secured on its upper surface a rigid column support in which is secured one end of a cylindrical column that extends approximately 2 feet above the base. Secured to and surrounding the column adjacent its upper end for axial adjustment thereon are two, axially spaced clamps. The lower clamp has a key which projects slidably into a vertical keyway formed in the periphery of a column to prevent rotation of the clamp relative to the column. A threaded lead screw worm is secured at its lower end in the rigid column support, and extends upwardly in spaced, parallel relation to the column, and into a registering opening in the lower clamp, wherein it is connected to a conventional worm gearing mechanism. The worm gearing mechanism is connected to a manually operable wheel which can be rotated for selectively raising and lowering the lower clamp on the column.

Mounted at one end thereof between the two clamps on the column, and for pivotal movement relative to the column, is a rear, tool supporting arm the opposite end of which contains a rotatable pivot pin. The upper end of the pin is fixed in the rear end of a forearm which is secured to the upper end of the pivot pin for pivotal movement therewith relative to the rear arm. At its opposite end the forearm has mounted thereon an electric motor the drive shaft of which is connected to a conventional quill mechanism to drive the spindle thereof about an axis parallel to the axes about which the rear and forearms pivot. The quill spindle has releasably attached to its lower end a conventional tool chuck which is movable vertically relative to a workpiece via a manually operable handle which is drivingly connected to the quill mechanism to shift its spindle downwardly toward a workpiece and against the resistance of a torsion spring.

The electric motor is connected to a manually adjustable potentiometer (pot) for selectively driving the motor shaft at anywhere from approximately zero to 3,000 RPM. The pot is mounted on the forearm adjacent to a motor reversing switch, which is movable manually between two different positions selectively to drive the motor shaft in one direction or the other. The speed of the motor is controlled automatically to maintain a fixed torque on the tool bit then in use. For example, when extra load is applied to a drill tool bit, the motor speed is adjusted automatically to increase the torque sufficiently to counter the increased resistance to drilling encountered by the tool bit.

Each of the clamps, which control the vertical adjustment of the rear arm on the column, has an associated locking mechanism that includes a manually operable arm for releasably locking or unlocking a respective clamp with respect to the column. Similar locking mechanisms are interposed between the column and the rear arm, and between the outer end of the rear arm and the rotatable pivot pin to which the forearm is attached. These locking mechanisms are operable selectively to secure the rear arm against rotation relative to the column, and to secure the pivot pin and attached forearm against rotation relative to the rear arm.

THE DRAWINGS

DETAILED DESCRIPTION OF THE PREFERRED EMBODIMENT

Figure 1:
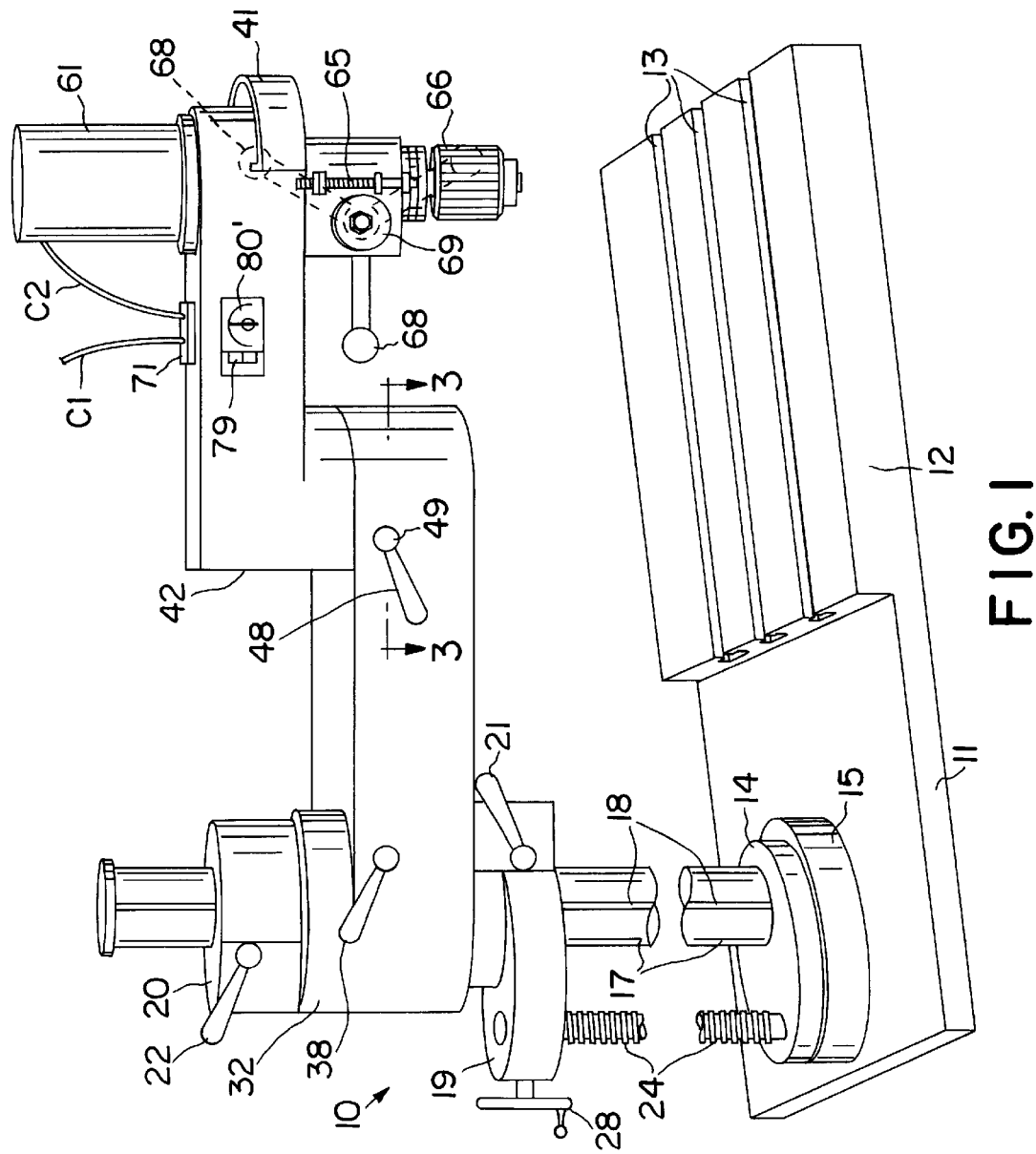
FIG. 1 is a side perspective view of an improved machine of the type described made according to one embodiment of this invention.
Figure 2:
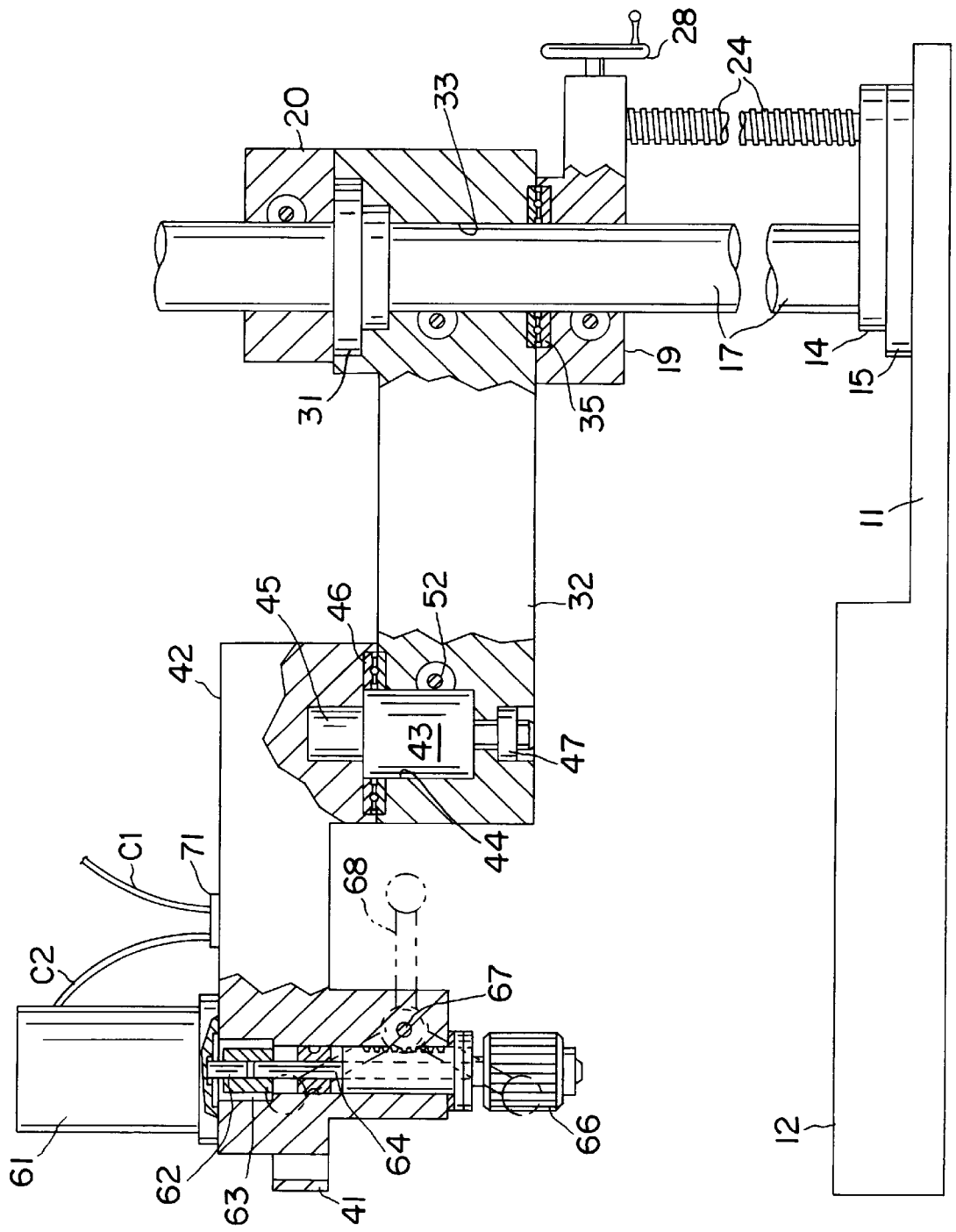
FIG. 2 is a fragmentary side elevational view of the machine as seen from the side thereof opposite of the side shown in FIG. 1, and with portions of the machine being broken away and shown in section.

Referring now to the drawings by numerals of reference, and first to FIGS. 1 and 2, 10 denotes generally an improved drilling, tapping and reaming machine comprising an elongate, generally flat base 11 which has a plane, flat bottom surface. Base 11 has formed on its upper surface adjacent its forward end an integral jig or fixture support 12 having in its upper surface a plurality of spaced, parallel rearwardly extending slots 13 which are generally inverted T-shaped in cross section. For purposes noted hereinafter, base 11 is made from 30 to 45 MPSI gray cast iron, and weighs approximately 240 pounds. Also secured on the upper surface of base 11 adjacent its opposite end (the rear end of the base) is a rigid column support or foot 14 having a flange 15 which in practice can be utilized to secure foot 14 to the base 11 and to help secure the latter to the surface of an associated support, such as a machine frame or the like (not illustrated).

Secured at its lower end in a circular opening in the collar or foot 14 is an elongate, cylindrical machine column 17, which projects vertically upwardly from the base 11, and which has in its outer peripheral surface an axially extending groove or keyway 18. By way of example, the column has a diameter of approximately four inches, is approximately three feet in length, and in practice may weigh approximately 140 pounds. Surrounding column 17 adjacent its upper end for vertical adjustment thereon are two, axially spaced clamps 19 and 20. Each of the clamps 19 and 20 has mounted thereon adjacent one diametral side of column 17 a clamp lock mechanism, such lock mechanisms being similar in construction and having manually operable arms or handles 21 and 22, respectively, which are disposed to be pivoted into and out of a clamping positions in which the clamps are secured against vertical movement on the column 17. Clamp 19 also includes a key (not illustrated) which projects slidably into the slot 18 in the column 17 to prevent any undesirable rotation of the clamp 19 relative to column 17.

Rotatably secured at its lower end in the foot 14 adjacent to column 17, and projecting vertically upwardly in spaced, parallel relation to column 17, and into an opening formed in the underside of the clamp 19 is an Acme threaded lead screw worm 24. Worm 24 is connected in the clamp 19 with a conventional worm gearing mechanism having an output shaft that extends externally of the clamp 19, and which is secured to an elevating hand wheel 28. Wheel 28 is operable to shift the clamp 19 vertically on the column 17 when the clamp lock handle 21 is in its released position.

Rotatably mounted at its inner end thereof on column 17 between the clamps 19 and 20 is a rear, tool supporting arm 32. Column 17 extends coaxially through a circular opening 33, which is formed in arm 32, and which has therein adjacent its upper end (FIG. 2) a cylindrical bearing 31, and in its lower end a radial thrust bearing 35 which is interposed between arm 32 and the clamp 19. At its opposite, outer end (left end in FIG. 2) the rear arm 32 is pivotally connected to the rear or inner end of another arm, a forearm 42, by means of a cylindrical pivot pin 43 (FIG. 2). Pin 43 is rotatably mounted intermediate its ends in a circular opening 44 formed in arm 32 adjacent its outer end, and has a reduced-diameter upper end 45 that projects coaxially upwardly into and is fixed in a registering, circular recess formed in the underside of the forearm 42 at its inner end. A radial thrust bearing 46 surrounds pivot pin 43 between the arms 32 and 42; and the lower end of pin 43 has a reduced-diameter section supported by an angular contact ball bearing assembly 47 mounted in arm 32 at the lower end of opening 44. Arm 32 is thus mounted for pivotal and rotational (through 360°) movement about the column 17, while the forearm 42, which has an integral handle section 41 formed on its outer end, is mounted at its inner end for pivotal movement with the pin 43 relative to arm 32. However, rotation of arm 32 relative to the column 17 is controlled by another lock mechanism which is interposed between the arm 32 and the column 17, and which also is controlled by a manually operated arm 38 (FIG. 1). Likewise rotation of the pivot pin 43 in the opening 44 in arm 32, and hence rotation of the forearm 42 relative to the arm 32, is controlled by another lock mechanism which is interposed between arm 32 and the pivot pin 43, and which, like the above-noted lock mechanisms is controlled by a manually operable arm 48 (FIG. 1).

Figure 3:
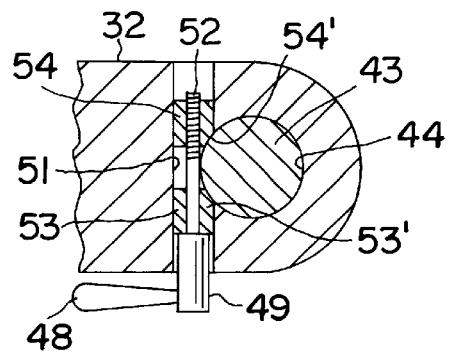
FIG. 3 is a slightly enlarged, fragmentary sectional view taken generally along the line 3—3 in FIG. 1 looking in the direction of the arrows.

As shown in FIG. 3, a typical such lock mechanism, which is controlled by arm 48, includes a cylindrically shaped head 49 secured adjacent an outer end thereof to one end of arm 48. Head 49 projects at its inner end rotatably and coaxially into one end of a circular opening 51 formed through arm 32 at right angles to the bore 44 in arm 32, and opening intermediate its ends on bore 44 so that an arcuate portion of the peripheral surface of pin 43 projects into bore 51 at one diametral side thereof. A reduced diameter shank section 52 of head 49 projects slidably through an axial bore in a first cylindrical lock block 53, which is axially slidable in bore 51 beneath head 49, and which threads at its opposite end into an internally threaded bore formed in another cylindrical lock block 54 that is slidable in the opposite end of bore 51. Portions of the inner ends of the blocks 53 and 54, which confront upon the peripheral surface of pin 43, are cut away, thus forming on blocks 53 and 54 inclined, plane surfaces 53' and 54', respectively. These surfaces are disposed to be urged into frictional, clamping relation with the registering surface of pin 43 when arm 48 rotates the head 49 in a direction to cause the threaded end of shank 52 to draw the blocks 53 and 54 toward each other until their inclined surfaces 53' and 54' frictionally engage the registering portion of pin 43, thus locking arm 42 against rotation on arm 32. When arm 48 is rotated in the opposite direction the threaded end of shank 52 is backed part way out of the bore in block 54 thus permitting the blocks to return to their unlocking positions relative to pin 43 and arm 42.

Secured on the upper surface of the outer or forearm 42 adjacent the outer end thereof is an electric motor 61 having a splined operating shaft 62 (FIG. 2) which extends coaxially downwardly into a circular opening 63 formed in the outer end of arm 42, and into driving engagement with the spindle 64 of a conventional quill assembly which is mounted in the opening 63. Spindle 64, which projects at its lower end beneath the arm 42 and has removably mounted thereon a conventional tool chuck 66, is disposed to be shifted vertically for approximately 2.0 inches relative to arm 42 and an associated feed adjusting screw 65 (FIG. 1), by a splined, rotatable drive shaft 67. Drive shaft 67, which is drivingly engaged intermediate its ends in conventional manner with the quill assembly, is manually operable by one of a plurality of radial arms 68 that project from one end of shaft 67. Shaft 67 is connected at its opposite end to a quill return torsion spring which is located beneath a cap 69 (FIG. 1) on arm 42, and which is operative to return the quill assembly and hence spindle 64 to retracted positions (FIG. 1) as soon as the operator releases the arms 68.

Motor 61 is a reversible, variable speed permanent magnet 90 volt DC motor of approximately ⅓ horsepower, and is offered for sale by ECM Motor Co. of Elkhorn, Wis. It is designed for a 120 or 240 volt AC power supply, and has been provided with a load and line voltage regulator and electronic current limiting system, which protects motor 61 and controls against overload, by limiting the maximum level of output current. This control results from a PCB (printed circuit board) 71, which is shown in FIG. 1, and is mounted on the upper surface of arm 42 adjacent to the motor 61.

Voltage from the power supply cord C1 is supplied via board 71, and from there by cord C2 to the motor 61.

Figure 4:
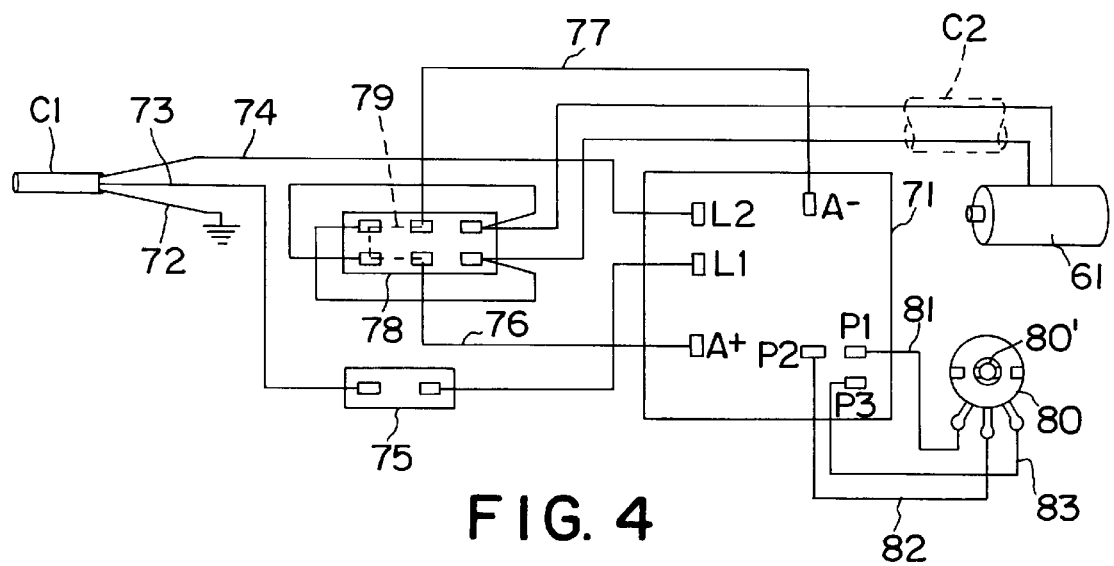
FIG. 4 is a schematic wiring diagram showing the controls for the electric motor employed in this invention for driving the tool bit.

As shown more clearly in FIG. 4 the power supply cord C1 is a three wire system having one grounded lead 72 and two hot leads 73 and 74 across which there is a voltage drop of 120 or 240 volts. Line 73 is connected through a single pole ON/OFF switch 75 to a terminal L1 on the face of board 71. The other lead 74 of the power supply C1 is connected directly to another input terminal L2 of board 71. Board 71 has output terminals A+ and A−, which are connected by lines 76 and 77, respectively, with the two input terminals of a conventional two pole, double throw switch 78, which is utilized to selectively reverse the rotation of motor 61. For this purpose switch 78 has a conventional, manually operable switch contact 79 (broken lines in FIG. 4) pivotal between two different operative positions on the switch 78, in one of which it connects terminals A+ and A− to one each of the two lines carried by the motor supply cord C2, and in the other position of which it reverses the lines of C2 to which the terminals A+ and A− are connected. As shown in FIG. 1 switch 78 is mounted on the side of arm 42 so that its switch contact 79 can be readily moved to one or the other of its two limit positions selectively to reverse the direction of rotation motor 61.

Also as shown in FIG. 4, a manually adjustable potentiometer 80 has three output lines 81, 82 and 83, which are connected to terminals P1, P2 and P3 on the board 71. The potentiometer 80 has a manually rotatable control knob 80', which is shown in FIG. 1 to be mounted on the side of arm 42 adjacent to the switch 78, and which is manually adjustable to set the RPM of the motor 61 anywhere from approximately zero to 3,000 RPM. In use, the output motor speed produced by board 71 is a linear function of the potentiometer 80. Moreover, the line 81 of the potentiometer is connected to a trimpot (variable resistance), which can be adjusted on board 71 to set a minimum speed for the motor 61; and line 83 is connected to another trimpot which may be adjusted at the outset (at the factory) to set the maximum speed at which the motor 61 will operate. Also the line 82 of the potentiometer 80 is connected to another trimpot, which again may be adjusted at the factory to improve load regulation. Still another trimpot (not illustrated) in the board 71 can be set at the factory to protect the motor 61 and its controls from overload.

From the foregoing it will be apparent that the present invention provides an improved, variable speed, universal drilling, tapping, reaming and boring machine which is extremely accurate in connection with all adjustments made during movement of its associated tool bit from registering with one workpiece to another. In this connection it will be readily apparent to one skilled in the art that the tool chuck 66 is designed to have removably secured therein any one of a plurality of different tool bits, for example a drill bit, a reaming bit, a boring bit and a tapping bit, as well as counterboring or countersinking tool bits. Since the rigid, cast iron base 11 of the machine weighs approximately 240 pounds, it functions satisfactorily to counterbalance the tendency of the rear arm and forearm 32 and 42 from tending to exert a very strong moment force on the vertical column 17. This stability is also enhanced by virtue of the fact that the column 17 itself weighs in the vicinity of 140 pounds, and since it is secured by the collar or foot 14 directly to the base 11, this also tends to stabilize both the base and the column. Unlike permanent installations, and notwithstanding the weight of the base 11 and column 17, machine 10 has the advantage of being relatively easy to move from one machine frame or support to another, if desired.

Both the rear and forward arms 32 and 42 are pivotally mounted for horizontal movement, respectively, on column 17, and via pin 43 on the outer end of arm 32. Moreover, each arm has a feather touch type of pivotal movement for accurately locating the associated tool bit 66 with respect to any workpiece (not illustrated) secured on support 12. When they reach their adjusted positions the arms can be locked against further pivotal movement by operation of the locking arms 38 and 48, respectively. When the locking arms 21 and 22 have been swung to their released position, the two arms 32 and 42 can be vertically adjusted in unison on column 17 by rotation of the elevating hand wheel 28, which is drivingly connected with the threaded lead screw worm 24. This perpendicular adjustment of the arms, as well as the pivotal movements thereof, are made without compromising in any way the accuracy (perpendicularity) of any resultant drilling, tapping, reaming or boring operation. If during such an operation the associated tool bit becomes jammed in the work, the operator need only to operate the switch 78 to reverse the rotation of the motor, thereby to dislodge the tool bit from the associated work, if necessary. If the tool bit does not become jammed in the workpiece, but instead encounters more resistance, then the motor's speed control functions to adjust the speed automatically, thereby maintaining the fixed torque to compensate for the extra load encountered by the tool bit.

While this invention has been illustrated and described in detail in connection with only certain embodiments thereof, it will be apparent it is capable of still further modification, and that this application is intended to cover any such modifications as may fall within the scope of one skilled in the art, or the appended claims.

I claim:

1. A machine for selectively drilling, tapping, reaming or boring a workpiece, comprising an elongate, generally flat, rigid base having a plane bottom surface for removably supporting the base horizontally on a machine frame, said base having an integral work support formed on its upper surface adjacent one end thereof and disposed to have a workpiece secured thereon, a rigid, cylindrical column secured at one end thereof to the upper surface of said base adjacent the opposite end thereof, and projecting vertically above said base, an elevating clamp mounted adjacent one end thereof on said column solely for vertical adjustment thereon, means drivingly connected to said clamp adjacent the opposite end thereof and operable manually to shift said clamp into different vertical positions on said column, a pair of elongate, rigid, tool supporting arms, one of said arms being mounted adjacent one end thereof on said column for vertical adjustment thereon by said clamp, and for rotational adjustment relative to said column and said clamp about an axis parallel to the axis of said column, means mounting the other of said arms adjacent one end thereof on said one arm adjacent the opposite end thereof for rotational adjustment relative to said one arm about an axis parallel to the axis of rotation of said one arm, and for vertical adjustment with said one arm relative to said column, a quill assembly mounted in an opening in said other arm adjacent the opposite end thereof, and having a rotatable tool supporting spindle extending parallel to and radially spaced a fixed distance from said axis of rotation of said other arm, and projecting at one end beneath said other arm to have a tool bit removably secured thereto, and a reversible electric motor secured on said opposite end of said other arm and having the drive shaft thereof extending into said opening and being drivingly connected to said spindle to impart rotation thereto about an axis parallel to the axis of said column.

2. A machine as defined in claim 1, including a control circuit for said motor having an AC power supply and a switch mounted on said other arm adjacent said motor and being operable manually and selectively to reverse the direction of rotation of said drive shaft of said motor, and the spindle connected thereto.

3. A machine as defined in claim 2 said control circuit further including a potentiometer connected to said motor and having a rotatable control knob mounted on said other arm adjacent said switch for manual adjustment selectively to increase or decrease the speed of rotation of said motor drive shaft.

4. A machine as defined in claim 1, wherein said work support has in the surface thereof a plurality of spaced, parallel, grooves extending longitudinally of said base and normal to said column.

5. A machine as defined in claim 1, including means interposed between said column and said one arm, and operable manually from the exterior of said one arm releasably to lock said one arm against rotation relative to said column.

6. A machine as defined in claim 1, including means interposed between said one arm and said other arm, and operable manually from the exterior of said other arm adjacent said one end thereof releasably to lock said other arm against rotation relative to said one arm.

7. A machine as defined in claim 1, wherein said mounting means for said other arm includes a cylindrical pivot pin secured at one end in said other arm adjacent said one end thereof, and projecting at its opposite end rotatably and coaxially into an angular contact bearing assembly mounted in a registering bore formed in said opposite end of said one arm, and operative to support said other arm for said rotational adjustment on said one arm.

8. A machine as defined in claim 7, including means for releasably locking said other arm against rotation relative to said one arm, comprising a pair of cylindrical lock blocks mounted coaxially in opposite ends of a circular bore extending through said one arm at right angles to said pivot pin, said pivot pin having intermediate the ends thereof an arcuate portion of its peripheral surface projecting part way into said circular bore intermediate the ends thereof, and means interconnecting said lock blocks and manually operable selectively to move said blocks axially between an unlocking position in which the confronting ends of said blocks are spaced from said arcuate portion of said pin, and a locking position in which said confronting ends of said blocks are frictionally engaged with said arcuate portion of said pin to prevent rotation thereof in said one arm.

9. A machine as defined in claim 1, wherein said elevating clamp comprises one of a pair of vertically spaced clamps surrounding said column at opposite sides of said one end of said one arm and operative to secure said one arm in any one of a plurality of different vertical positions on said column, said means drivingly connected to said elevating clamp is manually operable to effect movement of both said clamps and said one arm into different vertical portions on said column, and means is provided for releasably securing said clamps against vertical movement on said column by said manually operable means.

10. A machine as defined in claim 9, including a handle on said other arm drivingly connected to said spindle, and disposed to be grasped and moved manually in one direction to shift said spindle axially downwardly relative to said other arm and toward said base, and a spring interposed between said handle and said spindle and operative to return said spindle upwardly relative to said other arms when said handle is released.

11. A machine as defined in claim 1, wherein said reversible motor is operable to rotate said drive shaft thereof in a range of approximately 0 to 3000 r.p.m., and automatically to increase the torque applied by said drive shaft to an associated tool bit when said bit encounters increased resistance from a workpiece with which the tool bit is engaged.

12. A machine as defined in claim 9, wherein said elevating clamp is engaged with the underside of said one end of said one arm and is keyed to said column to prevent rotation thereof relative to said column.

13. A machine as defined in claim 1, wherein said drive shaft of said motor has formed on the exterior thereof a splined surface, and means positioned in said opening in said other arm between said shaft and said spindle drivingly connects the splined outer surface of said shaft to said spindle.

14. A machine as defined in claim 7, including a thrust bearing surrounding said pivot pin adjacent said one end thereof and interposed confronting surfaces on said one arm and said other arm, respectively.

15. A machine as defined in claim 12, including a thrust bearing surrounding said column intermediate the ends thereof and interposed between confronting surfaces on said one arm and said elevating clamp, respectively.

16. A machine as defined in claim 15, wherein the other of said clamps overlies the upper surface of said one arm at the side thereof opposite the side engaged by said elevating clamp, and a ball bearing assembly surrounds said column and is seated in a recess in said upper surface of said one arm beneath said other clamp.

\* \* \* \* \*

UNITED STATES PATENT AND TRADEMARK OFFICE
CERTIFICATE OF CORRECTION

PATENT NO. : 5,902,077
DATED : May 11, 1999
INVENTOR(S) : Achyuta N. Halder

It is certified that error appears in the above-identified patent and that said Letters Patent is hereby corrected as shown below:

On the title page, delete item [73] in its entirety.

Signed and Sealed this

Thirty-first Day of August, 1999

Attest:

Q. TODD DICKINSON

*Attesting Officer*   *Acting Commissioner of Patents and Trademarks*